United States Patent

[11] 3,633,079

[72] Inventor Alvin N. Watson
Glendora, Calif.

[21] Appl. No. 32,807
[22] Filed Apr. 29, 1970
[45] Patented Jan. 4, 1972
[73] Assignee Johanson Technology, Inc.
Boonton, N.J.

[54] CAPACITOR WITH MALLEABLE MEANS FOR PROVIDING A HERMETIC SEAL AND STRAIN RELIEF
14 Claims, 4 Drawing Figs.

[52] U.S. Cl. ........ 317/242, 29/25.42, 174/52 S, 338/273
[51] Int. Cl. ........ H01g 1/02, H01g 1/14, H01g 3/06
[50] Field of Search ........ 317/242, 258; 174/50.61, 50.63, 52 S; 338/226, 237, 273, 274, 275, 276, 329; 65/36, 42, 59; 29/25.42, 472.9, 473.1

[56] References Cited
UNITED STATES PATENTS

| | | | |
|---|---|---|---|
| 2,552,653 | 5/1951 | Stupakoff | 317/242 |
| 3,169,217 | 2/1965 | Dalton | 317/258 UX |
| 3,447,236 | 6/1969 | Hatcher, Jr. | 29/472.9 X |
| 3,458,783 | 7/1969 | Rosenberg | 317/242 |

*Primary Examiner*—Laramie E. Askin
*Attorney*—Angus & Mon

ABSTRACT: Capacitor in which a ceramic chip is held compressively between two metal heads by a peripheral glass sheath. A layer of malleable metal is provided between the end faces of the chip and each of the heads, and also a peripheral band of malleable metal extends around a cylindrical surface on each head which is embraced by the glass sheath, the heads and chips being held together only by compressive force exerted by the sheath, the malleable metal providing a compressive joinder between the abutting faces resistive to thermal and mechanical shock and between the sheath and heads providing for relief of excessive forces due to variations in tolerances of the parts and for a reliable hermetic seal.

PATENTED JAN 4 1972 3,633,079

INVENTOR.
ALVIN N. WATSON
BY Angus & Mon
ATTORNEYS.

CAPACITOR WITH MALLEABLE MEANS FOR PROVIDING A HERMETIC SEAL AND STRAIN RELIEF

This invention relates to improved monolithic ceramic capacitors, and particularly to monolithic ceramic capacitors encased in glass or ceramic sheaths.

One problem associated with encapsulated monolithic ceramic capacitors has been securing proper electrical contact between the monolithic ceramic chip and the electrical leads to which the chip should be connected. One technique has been suggested whereby the chip and the heads of leads are first clad with dissimilar metals and after the device is assembled into a sheath, such as a glass or ceramic sheath, heat is applied to the device to braze or weld the cladded head to the cladded chip. However, such brazing techniques have not been altogether successful because the heat required to effectuate a proper braze between the dissimilar cladded materials often had a deleterious effect on the sheath and the chip thereby resulting in an inferior device. Furthermore, sometimes the braze or weld failed, resulting in a disconnected lead and a malfunction part.

It is an object of this invention to provide a ceramic capacitor which can readily be produced with mass production techniques which allows for tolerance ranges that would otherwise be unacceptable, which forms a reliable hermetic seal, and which has means for relieving thermal and mechanical stresses.

It is another object of this invention to provide a capacitor which can be made small in size, and at a fraction of the cost of prior art devices of the same general nature.

A capacitor according to this invention includes a ceramic chip having a pair of opposed parallel end faces, a pair of metal heads brought to bear against the ceramic chip, and a surrounding glass sheath. A layer of malleable material is interposed between the end faces of the ceramic chip and the abutting faces of the heads, and also a peripheral band of malleable material surrounds the heads and is embraced by the glass sheath. The malleable metals deform as a consequence of their malleability to fully conform to their opposed surfaces so as to make a good hermetic seal. They also have within themselves the inherent property of relieving excessive stresses imposed on them by flowing so as to prevent cracking of the glass sheath when it is thermally shrunk onto the head by changing shape in the event that the tolerances of adjacent part are somewhat out of size and also to resist cracking and other damage due to thermal and physical shock such as vibrational shock.

According to a feature of the invention, the joinder between the heads and the ceramic chip is solely compressive in nature, and there is no bonding or other connection between them which is resistive to tensile forces.

The above and other features of this invention will be more fully understood from the following detailed description and the accompanying drawings, in which.

Figure 1:
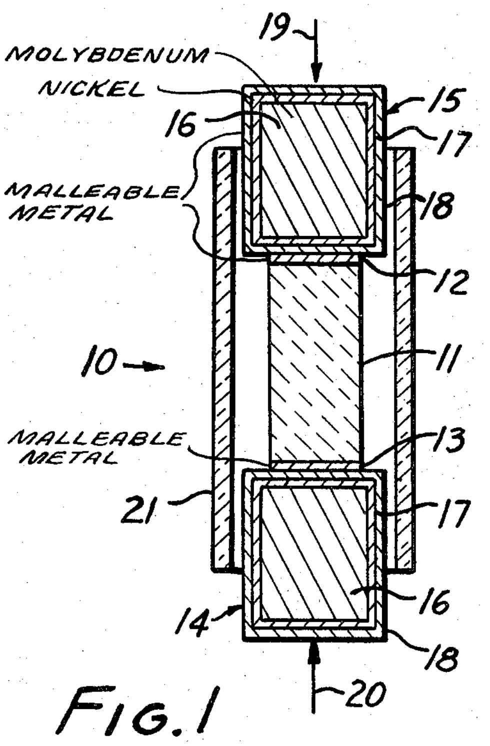
FIG. 1 is a side view elevation in cutaway cross section showing the method of constructing a sheathed monolithic ceramic capacitor in accordance with the presently preferred embodiment of the present invention.

Referring to the drawings, there is illustrated a monolithic ceramic capacitor 10 comprising a monolithic ceramic chip 11 having metal layers 12 and 13 clad to opposite ends thereof. Layers 12 and 13 may be thin layers of silver metal applied to or deposited onto each end of chip 11. Heads 14 and 15 each comprise a molybdenum head 16 having a nickel layer 17 disposed thereon and a silver layer 18 disposed over the nickel layer. By way of example, the nickel layer may be applied to the molybdenum head by firing nickel into the surface of the molybdenum head 16 in a hydrogen atmosphere to provide a surface retentive to a thicker nickel layer which can be laid down in a subsequent operation. Nickel layer 17 is then applied to the molybdenum head to form a relatively hard nickel layer over the molybdenum head. Silver is thereafter fired into the nickel layer in a hydrogen atmosphere to make the nickel adherent to the softer silver metal, and a silver layer 18 is then applied to the nickel layer 17 having silver fired into its surface.

Heads 14 and 15 are then placed on each side of chip 11 so that the silver layer 18 on head 15 contacts silver layer 12 on chip 11, and so that the silver layer 18 on head 14 makes electrical contact with the silver layer 13 on chip 11. A force is then applied to the heads in the direction of arrows 19 and 20 to hold the chip in a tight sandwich arrangement between heads 14 and 15. Typically, a force of about 20 pounds/in.$^2$ is adequate for most purposes. Glass sleeve 21 is positioned over the arrangement and is somewhat shorter than the overall length of the sandwich comprising the component and two heads, but is significantly longer than chip 11.

Glass sleeve 21 is of the type which shrinks when subjected to an elevated temperature. The glass sleeve is heated to a temperature of about 710° C. so as to shrink fit over heads 14 and 15. In shrinking the glass sleeve 21 onto heads 14 and 15, the axial length of the device shortens in the direction of arrows 19 and 20. Sleeve 21 makes a tight friction fit over heads 14 and 15 so that as the sleeve shrinks, it imposes an axial force onto the heads in the direction of arrows 19 and 20 thereby assuring a compressive force between the clad on the chip and the clad on heads 14 and 15. The axial draw of the heads toward each other by virtue of the shrink fit of sleeve 21 causes the soft silver clads to slightly deform thereby assuring positive electrical contact between heads 14 and 15 and the component, respectively. The foregoing shrinkage is that which occurs when the tube is heated to a softening temperature below its melting point. It is obvious that thereafter, when it is cooled to room temperature, there will be further shrinkage as a consequence of its positive coefficient of thermal expansion.

The glass sleeve 21 is of the type whose thermal coefficient of expansion closely matches that of the molybdenum heads 14 and 15. Hence, the arrangement remains intact even when subjected to severe temperature changes. This glass is commercially available as "Moly-matching glass" from Corning Glass Company and others. The glass is available containing lead oxide, and some glasses are available which are alkaline free. The alkaline-free glass is particularly useful in connection with precision capacitors to prevent the sleeve from affecting the operation of the capacitor.

The glass is heat-shrunk at a temperature somewhat below the softening temperature of molybdenum, and may be effectuated at any desirable pressure or in any desirable gaseous atmosphere, or even in a vacuum. Ordinarily, the glass is shrunk at a temperature of about 710° C. and at a slightly increased pressure and in an inert atmosphere.

Figure 2:
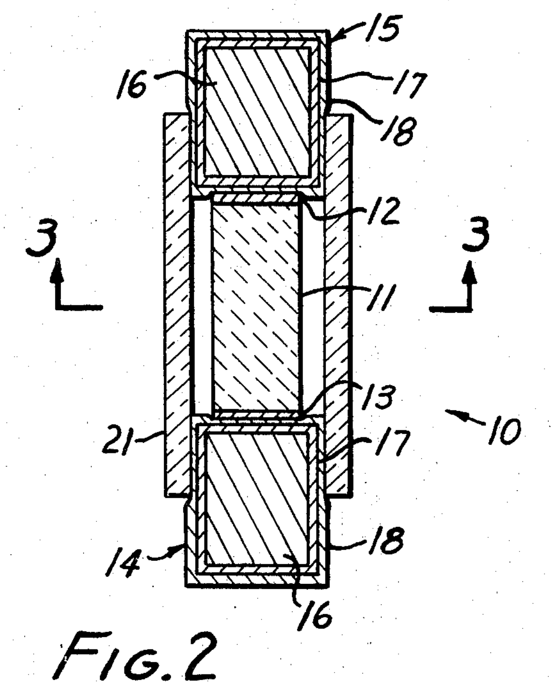
FIG. 2 is a side view elevation in cutaway cross section of the capacitor illustrated in FIG. 1.
Figure 3:
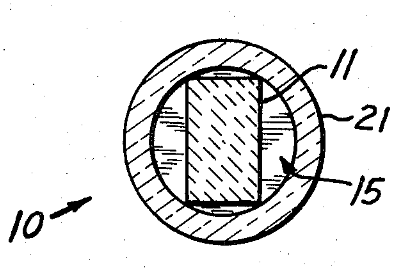
FIG. 3 is a section taken at line 3—3 in FIG. 2.
Figure 4:
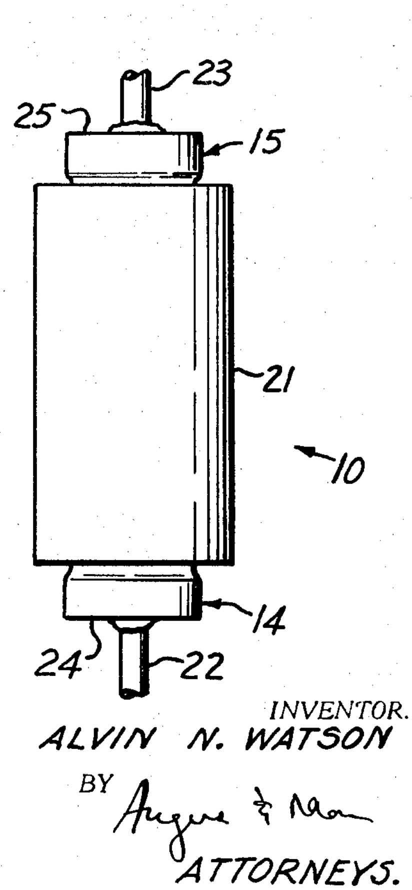
FIG. 4 is a side elevation of the completed capacitor illustrated in FIG. 2.

Upon completion of the part as illustrated in FIGS. 2 and 3, electrical leads 22 and 23 may be brazed to the outer surface 24 and 25, respectively, of heads 14 and 15. One feature of the invention resides in the fact that leads 22 and 23 may be constructed of any desirable material, such as copper, silver, tungsten, or even aluminum, depending upon the ultimate use of the device 10.

Another feature of the invention resides in the fact that if the "Moly-matching glass" forming sleeve 21 contains lead oxide, and if the leads 22 and 23 are brazed onto heads 14 and 15 in a "forming" gas atmosphere containing up to 15 percent hydrogen and more than 85 percent nitrogen, the glass forming sleeve 21 will turn to a dark, almost black, color, so that the part need not be coated or painted to make it attractive. The brazing of leads 22 and 23 may be accomplished in any atmosphere and at any desirable pressure but preferably not below ordinary atmospheric pressure, and may be accomplished at any temperature below the sealing temperature of the glass-forming sleeve 21. It is preferred that the brazing be accomplished in a forming gas atmosphere at a pressure somewhat above ordinary atmospheric pressure.

The capacitor in accordance with the present invention is a particularly rugged device. Chip 11 is held under a compressive force between heads 14 and 15 due to the axial draw caused by the shrinkage of sleeve 21. Although a force is applied in the direction of arrows 19 and 20 during the construction of the device, sleeve 21, being shrunk over heads 14 and 15, holds the device together with a compression force thereby assuring positive electrical contact between heads 14 and 15 and the chip.

The capacitor is effective in operation and may be manufactured in volume so that leads may be added separately according to ultimate use. The capacitor manufactured in accordance with the present invention is effective in operation and more reliable than prior sealed components in that there exists a lesser degree of failure due to breakage of electrical connection between the chip and its lead in capacitors constructed in accordance with the present invention than is likely in prior art devices, particularly devices wherein the head is brazed to the chip.

Layers 12 and 18 are of malleable material. It is an inherent function of malleable material that forces exerted thereto can cause cold flow of the material. Accordingly, the provision of a malleable material between the opposed end faces of the ceramic chip and of the head, and between the inner sidewall of the glass sheath and the outer sidewall of the head, will provide a metallic region whose surfaces will conform to fit an opposed surface in full hermetic sealing contact. It will also provide an element in which movement of the metal is possible to relieve excessive forces, such as excessive compressive forces exerted by the glass sheath when it cools, occasioned by using too small a diameter of tubing with too large a diameter of head, both of which might represent the outer limits of the tolerances for assembly of the device, and also to relieve the region between the chip and the head from similar excessive forces. It will be noted that in this invention there is no bonded or welded junction between any of the surfaces of the type which would resist tensile forces. Instead, if the glass sheath were broken, everything would simply fall apart. It is this joinder by pure compressive relationships which frees the device from many problems of prior art devices.

This invention is not to be limited by the embodiment shown in the drawings and described in the description, which is given by way of example and not of limitation, but only in accordance with the scope of the appended claims.

What is claimed is:

1 A capacitor comprising: a ceramic chip having a planar end face at two opposite ends, said end faces being parallel to each other; a pair of conductive metal heads, each head including a planar pressure face and a cylindrical peripheral sidewall, the sidewall having a central axis and the pressure face lying normal to said central axis, one of said pressure faces lying adjacent to each of said end faces; a band of malleable metal on said peripheral sidewall extending continuously around the same; a glass sheath having an internal cylindrical sidewall, all of the chip and at least part of both heads and of their bands of malleable metal lying axially within the sheath, the heads and chip being held by the sheath in a compressive electrically conductive joinder by axial force exerted by the sheath, the heads and chip not being joined to each other, but instead remaining as free bodies without bonding or discontinuous interconnection between them, the sidewall of the sheath bearing against the malleable layer to form a surface-to-surface, nonbonded, contiguous, hermetically sealing joinder, the band conforming to the surface configuration of the sidewall of the sheath, the chip, heads and sleeve being held assembled only by compressive force exerted by the sheath, the malleable band serving as a stress-relieving element to relieve force loads derived from temperature change and external forces, said relief occurring as a consequence of deformation inherent in the malleability and of the absence of joinder of a class resistive to tensile forces.

2. A capacitor according to claim 1 in which the malleable band is comprised of silver.

3. A capacitor according to claim 1 in which the glass of which the sheath is made is of a type which, when in tubular shape, its inner sidewall will shrink dimensionally when at a temperature below its melting point, whereby to exert a grip on the sidewalls of the heads.

4. A capacitor according to claim 3 in which the thermal coefficients of expansion of the glass and of the metal of which the heads are made are substantially equal.

5. A capacitor according to claim 1 in which the initial, free dimension of the inner sidewall of the sheath is greater than the diameter of the sidewall of the heads, the sheath having shrunk onto said heads, and in which the axial compressive force exerted by the heads on the chip are derived from their opposition to axial contraction of the sheath.

6. A capacitor according to claim 5 in which the glass of which the sheath is made is of a type which, when in tubular shape, its inner sidewall will shrink dimensionally when at a temperature below its melting point, whereby to exert a grip on the sidewalls of the heads.

7. A capacitor according to claim 6 in which the malleable band is comprised of silver.

8. A capacitor according to claim 1 in which a layer of malleable material is carried on one of said faces and is therefore interposed between them, the said layer also serving as a stress-relieving element to relieve force loads derived from temperature change and external forces, said relief occuring as a consequence of deformation inherent in the malleability and of the absence of joinder of a class resistive to tensile forces.

9. A capacitor according to claim 8 in which the malleable layer and band are made of silver.

10. A capacitor according to claim 8 in which the glass of which the sheath is made is of a type which, when in tubular shape, its inner sidewall will shrink dimensionally when at a temperature below its melting point, whereby to exert a grip on the sidewalls of the heads.

11. A capacitor according to claim 10 in which the thermal coefficients of expansion of the glass and of the metal of which the heads are made are substantially equal.

12. A capacitor according to claim 8 in which the initial, free dimension of the inner sidewall of the sheath is greater than the diameter of the sidewall of the heads, the sheath having shrunk onto said heads, and in which the axial compressive force exerted by the heads on the chip are derived from their opposition to axial contraction of the sheath.

13. A capacitor according to claim 12 in which the glass of which the sheath is made is of a type which, when in tubular shape, its inner sidewall will shrink dimensionally when at a temperature below its melting point, whereby to exert a grip on the sidewalls of the heads.

14. A capacitor according to claim 13 in which the malleable layer and band are made of silver.

* * * * *